United States Patent
Thomas et al.

(10) Patent No.: US 6,248,504 B1
(45) Date of Patent: Jun. 19, 2001

(54) METHOD FOR MANUFACTURING FIBER-REINFORCED PARTS UTILIZING STEREOLITHOGRAPHY TOOLING

(75) Inventors: Stan W. Thomas, Garland; Roger D. Key; Kyle G. Fluegel, both of Greenville; Willie K. Jackson, Commerce; Keith D. Elwell; Gary L. White, both of Greenville, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/392,416

(22) Filed: Feb. 22, 1995

Related U.S. Application Data

(63) Continuation of application No. 08/181,036, filed on Jan. 14, 1994, which is a continuation of application No. 08/020,727, filed on Feb. 22, 1993, now Pat. No. 5,296,335.

(51) Int. Cl.[7] ........................................ G03F 7/26
(52) U.S. Cl. .................... 430/320; 430/322; 264/22; 264/219; 264/258; 156/272.8; 156/275.5
(58) Field of Search .................. 430/320, 322; 264/22, 219, 258; 156/272.8, 275.5

(56) References Cited

U.S. PATENT DOCUMENTS

| | | | |
|---|---|---|---|
| 4,575,330 | 3/1986 | Hull | 425/174.4 |
| 4,929,402 | 5/1990 | Hull | 264/22 |
| 4,999,143 | 3/1991 | Hull et al. | 264/22 |
| 5,059,359 | 10/1991 | Hull et al. | 264/22 |
| 5,104,592 | 4/1992 | Hull et al. | 264/22 |
| 5,130,064 | 7/1992 | Smalley et al. | 264/22 |
| 5,137,662 | 8/1992 | Hull et al. | 264/22 |
| 5,164,128 * | 11/1992 | Modrek et al. | 264/22 |
| 5,174,943 | 12/1992 | Hull | 264/308 |
| 5,182,055 | 1/1993 | Allison et al. | 264/22 |
| 5,184,307 | 2/1993 | Hull et al. | 364/474.24 |
| 5,192,387 * | 3/1993 | Buckley | 264/22 |
| 5,192,559 | 3/1993 | Hull et al. | 425/89 |
| 5,217,654 * | 6/1993 | Buckley | 264/22 |
| 5,234,636 | 8/1993 | Hull et al. | 264/22 |
| 5,236,637 | 8/1993 | Hull | 264/22 |
| 5,238,639 | 8/1993 | Vinson et al. | 264/22 |
| 5,248,456 | 9/1993 | Evans, Jr. et al. | 264/22 |
| 5,256,340 | 10/1993 | Allison et al. | 264/22 |
| 5,267,013 * | 11/1993 | Spence | 264/22 |
| 5,273,691 | 12/1993 | Hull et al. | 264/22 |
| 5,296,335 * | 3/1994 | Thomas et al. | 264/22 |
| 5,344,298 | 9/1994 | Hull | 425/135 |
| 5,345,391 | 9/1994 | Hull et al. | 364/474.24 |

* cited by examiner

Primary Examiner—Hoa Van Le
(74) Attorney, Agent, or Firm—Baker Botts L.L.P.

(57) ABSTRACT

A method of manufacturing a three-dimensional fiber-reinforced part utilizing the single-tool method of stereolithography. The tool is fabricated by designing the tool on a computer-aided design system and curing successive layers of a fluid medium via a computer-controlled irradiation source to form the three-dimensional tool. The desired part is generated by applying layers of resin-wetted fabric to the tool, curing the fabric on the tool, removing the tool from the designed part and cleaning, trimming and inspecting the designed part.

10 Claims, 2 Drawing Sheets

METHOD FOR MANUFACTURING FIBER-REINFORCED PARTS UTILIZING STEREOLITHOGRAPHY TOOLING

This application is a continuation of Ser. No. 08/181,036 filed Jan. 14, 1994 which is a continuation of Ser. No. 08/020,727 filed Feb. 22, 1993 U.S. Pat. No. 5,296,335.

TECHNICAL FIELD

The present invention relates to methods for manufacturing three-dimensional parts, and more specifically to a method for manufacturing fiber-reinforced three-dimensional parts utilizing stereolithography tooling.

BACKGROUND OF THE INVENTION

The manufacture of fiber-reinforced three-dimensional parts is typically accomplished by one of two methods: master tooling; or "contact lay-up." The master tooling method includes the fabrication of a solid pattern typically of wood or metal via a multi-step tooling process. This method of tooling is not employed often due to the craftsmanship skills and experience needed to work with a solid wood or metal pattern.

Generally, the contact lay-up method of tooling includes the steps of: (1) fabricating a tool; (2) applying resin-wetted layers of fiber material to the tool; (3) curing the fiber layers; (4) removing the tool; and (5) trimming and cleaning the part. The primary disadvantage of this method of tooling is the amount of time and expense incurred to fabricate the tool. Manufacture of a single three-dimensional part by this method requires a minimum of three intermediate tools. If the part to be manufactured includes negative draft angles or other complex shaping requirements, more than three intermediate tools may be required. Additionally, design changes are difficult to incorporate. Finally, human error, storage and maintenance requirements, and labor-intensive in-processing severely limit this method.

Thus a need has arisen for a manufacturing method whereby fiber-reinforced three-dimensional parts are created utilizing a single-tool process, thereby minimizing material, time and labor resources while offering greater flexibility and accuracy.

SUMMARY OF THE INVENTION

The present invention overcomes the foregoing and other problems associated with the prior art by providing a manufacturing method utilizing stereolithography for making fiber-reinforced three-dimensional parts.

The present invention is a method for the manufacture of fiber-reinforced parts utilizing the single-tool fabrication step of stereolithography. Stereolithography ("SLA") is a method for generating three-dimensional articles within a fluid medium (photopolymer) by selectively curing successive layers of the liquid medium through the use of a computer-controlled irradiation source and a translation mechanism. SLA is known in the art and is currently utilized to fabricate engineering concept models and as patterns for sand and investment casting.

The method of the present invention includes the following steps: (1) fabricating a tool using SLA; (2) applying layers of resin-wetted fabric to the tool; (3) curing the fabric layers; (4) removing the tool after curing; and (5) cleaning and trimming the part.

The method of the present invention allows three-dimensional fiber-reinforced parts to be generated simply, quickly and economically, even where such parts are complex in shape or require design variations. Since the part is designed with the aid of a computer, human error during the processing stages is virtually eliminated.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
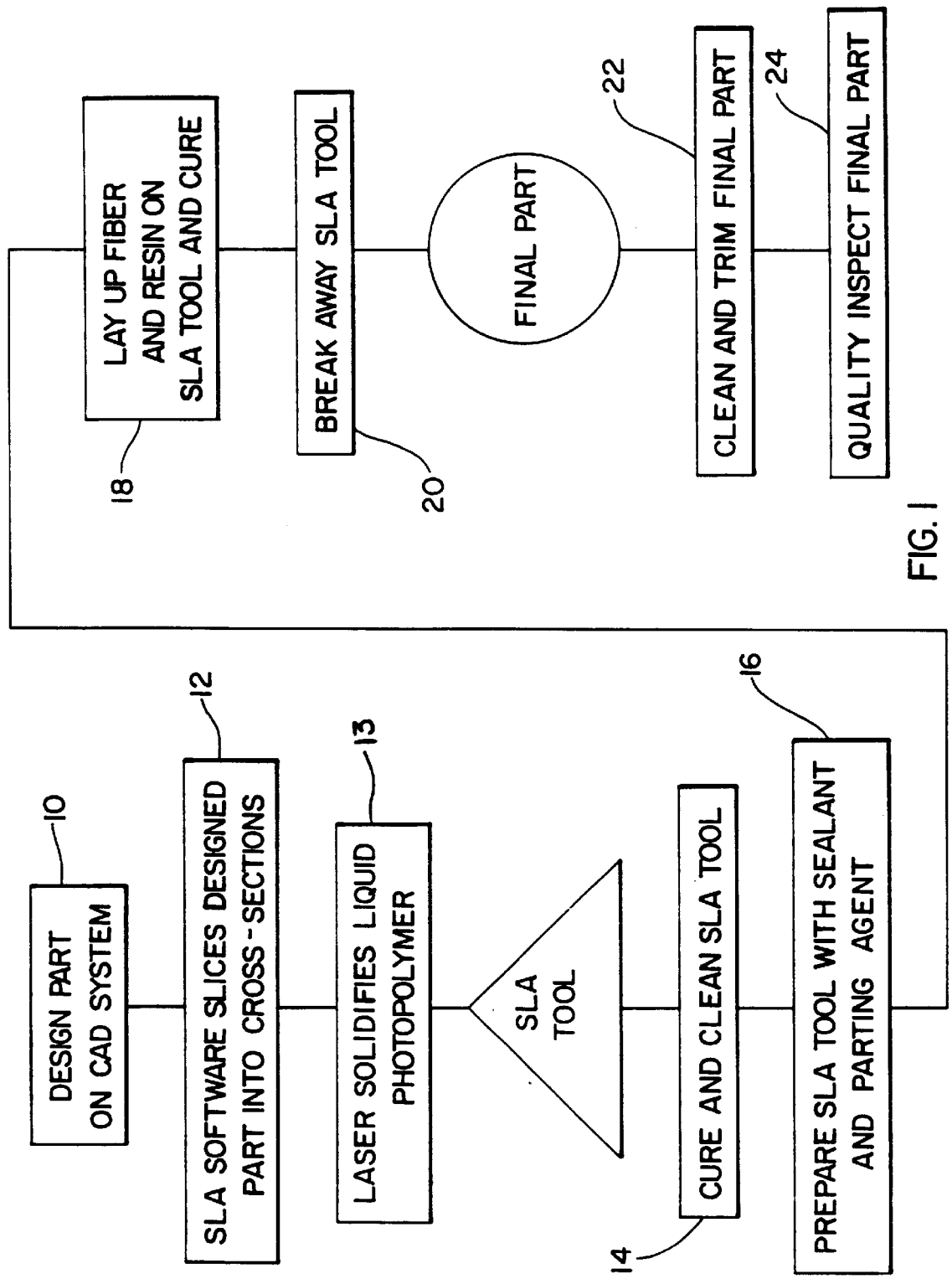
FIG. 1 is a flow chart representing the steps associated with the present invention for the manufacture of fiber-reinforced parts utilizing single-tool fabrication.

Referring now to FIG. 1, there is illustrated a flow chart representing the steps associated with the present invention for the manufacture of fiber-reinforced parts utilizing single-tool fabrication is shown.

First, a part is designed at step 10 on a computer-aided design system. This designed part is stored such that the part can be recalled and then reused and/or modified to incorporate design changes for the part. The designed part can also be recorded on paper media. Next, the part design is sliced into numerous imaginary cross-sections using stereolithography ("SLA") software in step 12. Once the design has been divided into cross-sections, a computer-controlled irradiation source (e.g., a laser) within a stereolithography apparatus is passed over the surface of a vat of photopolymer in step 13. A photopolymer is a liquid medium which responds to exposure to an irradiation source by changing states from a substantially liquid state to a substantially solid state. The computer guides the laser across the surface of the photopolymer according to the cross-sections of the part to be formed.

As the photopolymer is selectively cured into solid cross-sections of the part to be formed, the newly solidified cross-sections are slightly lowered from the surface of the photopolymer so that the next cross-section can be formed. This method of tooling avoids the multiple steps necessary with the prior art methods of tooling and allows the part to include complex shape requirements such as negative draft angles. The SLA tool is formed once all of the cross-sections have been cured by the irradiation source. The photopolymer used has the physical characteristic of brittleness when in a solid state. This allows the SLA tool to be easily broken away during a later step in the method.

Once the SLA tool is cleaned in step 14, the surface of the tool is prepared with a sealant and parting agent in step 16. Then, in step 18, successive layers of a resin-wetted fiber material are applied to the surface of the SLA tool. These layers of fiber are allowed to cure before the SLA tool is broken away in step 20. The final part is trimmed, cleaned and inspected in steps 22 and 24.

Figure 2:
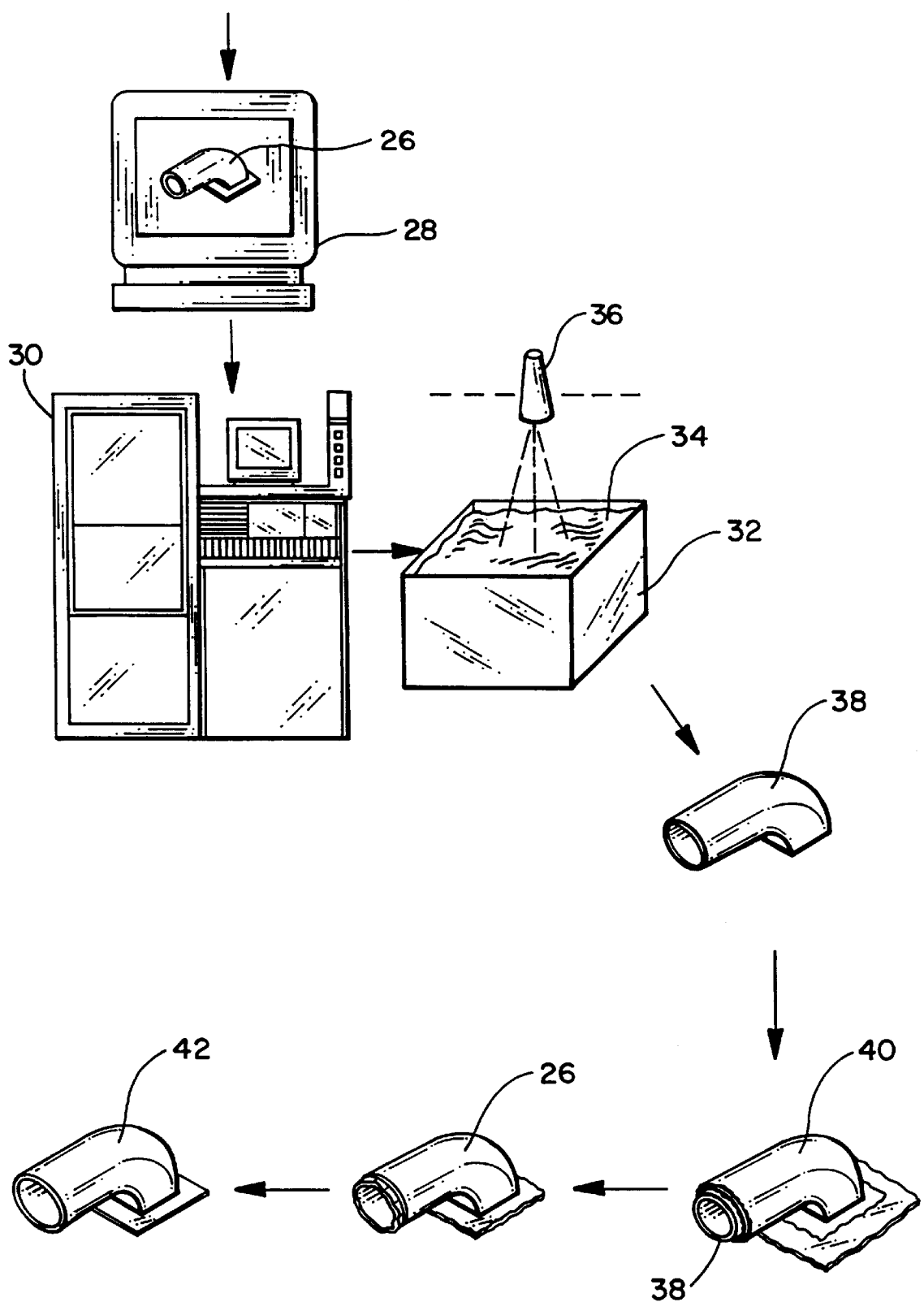
FIG. 2 is a schematic diagram illustrating the fabrication of a single part using the single-tool manufacturing method of the present invention.

In FIG. 2, there is shown a schematic of a single part, for example an airplane part, manufactured utilizing the single-tooling method of the present invention. The part 26 to be manufactured is first designed on a computer-aided drafting system 28. A SLA system 30 then fabricates a tool directly from the design. The SLA system 30 creates numerous imaginary cross-sections of the part 26 to be manufactured. The cross-sections are formed from a vat 32 of a photopolymer 34 capable of physical state changes upon exposure to an irradiation source (e.g., laser) 36. A photopolymer having the physical characteristic of brittleness upon curing is desirous so that the tool can be easily removed in a later step of the process. An example of such a photopolymer is the CIBATOOL resin photopolymer, product number SL-XB-5081-1, from Ciba-Geigy, Inc.

Within the SLA system 30, a computer-controlled optical scanning system (not shown) moves the laser across the surface of the photopolymer 34 such that the photopolymer is cured according to the cross-sections of the part to be designed. As each successive cross-section is formed from the surface of the photopolymer 34, the cross-section is lowered slightly to allow the next cross-section to be formed from the vat 32 of photopolymer 34.

Once a SLA tool 38 is formed from the cross-sections of the part 26, the tool 38 is completely cured in a post curing apparatus (not shown). Once cured, the tool 38 is prepared with a sealant and a parting agent. The tool 38 is then covered with successive layers of a resin-vetted fiber material 40 and allowed to cure. An epoxy or polyester resin is typically used. The amount of fiber material 40 used is determined by the structural requirements of the part 26.

Curing of the fiber material 40 is accomplished in approximately 12–24 hours at room temperature, or in a much shorter period (approximately an hour) by placing the fiber-coated tool in an oven elevated to 150 degrees Fahrenheit. After curing, the SLA tool 38 is shattered and removed from the interior of the designed part 26. Once trimmed and cleaned, the finished part 42 is quality inspected and ready for use.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

What is claimed is:

1. A method for producing a fiber-reinforced part utilizing stereolithography tooling, comprising the steps of:
   preparing a design for the part utilizing a computer-aided design system;
   stereolithographically fabricating a tool from the design;
   applying resin-wetted fiber material to the tool;
   curing the fiber material applied to the tool to form a fiber reinforced part; and
   removing the fiber reinforced part from the tool.

2. The method of claim 1 wherein the step of stereolithographically fabricating a tool from the design of the part includes the step of passing a computer guided irradiation source over a liquid medium having selective physical state transformation upon exposure to the irradiation source.

3. The method of claim 1 wherein the step of passing a computer guided irradiation source over a liquid medium further comprises passing the irradiation source over a photopolymer that changes from a substantially liquid state to a substantially solid state upon exposure to the irradiation source.

4. The method of claim 2 wherein the step of passing a computer guided irradiation source over a liquid medium further comprises passing the irradiation source over a photopolymer that changes from a substantially liquid state to a substantially brittle solid state upon exposure to the irradiation source.

5. The method of claim 1 wherein the step of stereolithographically fabricating a tool from the design of the part includes the step of preparing the surface of the tool for the application of a fiber material.

6. The method of claim 1 wherein the step of applying fiber material to the tool includes the step of applying multiple layers of a resin-wetted fiber material.

7. A method for producing a fiber-reinforced part utilizing stereolithography tooling, comprising the steps of:
   preparing a design for the part utilizing a computer-aided design system;
   stereolithographically fabricating a tool from the design by passing a computer guided irradiation source over a photopolymer that changes from a substantially liquid state to a substantially solid state upon exposure to the irradiation source;
   preparing the surface of the tool for the application of a fiber material;
   applying resin-wetted fiber material to the tool;
   curing the fiber material applied to the tool to form a fiber reinforced part; and
   removing the fiber reinforced part from the tool.

8. The method of claim 7 wherein the step of passing a computer guided irradiation source over a liquid medium further comprises passing the irradiation source over a photopolymer that changes from a substantially liquid state to a substantially brittle solid state upon exposure to the irradiation source.

9. The method of claim 7 wherein the step of applying fiber material to the tool includes the step of applying multiple layers of a resin-wetted fiber material.

10. A method for producing a fiber-reinforced part utilizing stereolithography tooling, comprising the steps of:
    preparing a design for the part using a computer-aided design system;
    creating multiple imaginary cross-sections of the part;
    fabricating a tool from the design by passing a computer guided irradiation source over a photopolymer to solidify successive cross-sections of the tool;
    lowering the solidified cross-sections of the tool from the surface of the photopolymer;
    preparing the surface of the tool for application of a resin-wetted fiber material;
    applying successive layers of the resin-wetted fiber material to the tool;
    curing the fiber material applied to the tool to form a fiber reinforced part; and
    removing the tool for final finishing of the part.

\* \* \* \* \*